(12) United States Patent
Raghunathan et al.

(10) Patent No.: US 11,658,606 B2
(45) Date of Patent: May 23, 2023

(54) ENERGY GENERATING PHOTOVOLTAIC AWNING WITH SCISSOR MECHANISM AND TILTING PHOTOVOLTAIC PANELS

(71) Applicant: EvoluSun Inc., San Jose, CA (US)

(72) Inventors: Rohini Raghunathan, Fremont, CA (US); Shashwat Kumaria, San Jose, CA (US); Vivek Phanse, San Mateo, CA (US); Miguel Martinho Lopes Praca, Cascais (PT)

(73) Assignee: Xponent Power, Inc., Fremont, CA (US)

( * ) Notice: Subject to any disclaimer, the term of this patent is extended or adjusted under 35 U.S.C. 154(b) by 0 days.

(21) Appl. No.: 16/932,751

(22) Filed: Jul. 18, 2020

(65) Prior Publication Data

US 2022/0021328 A1 Jan. 20, 2022

(51) Int. Cl.
| | | |
|---|---|---|
| *H02S 20/23* | (2014.01) | |
| *H02S 30/20* | (2014.01) | |
| *E06B 9/15* | (2006.01) | |
| *E04F 10/06* | (2006.01) | |
| *E04H 15/08* | (2006.01) | |

(52) U.S. Cl.
CPC .......... *H02S 20/23* (2014.12); *E04F 10/0644* (2013.01); *E04H 15/08* (2013.01); *E06B 9/15* (2013.01); *H02S 30/20* (2014.12)

(58) Field of Classification Search
CPC .......... H02S 20/30; H02S 30/20; H02S 20/23; E04H 15/08; E04H 15/58; E04F 10/00; E04F 10/0644
See application file for complete search history.

(56) References Cited

U.S. PATENT DOCUMENTS

| | | | | |
|---|---|---|---|---|
| 2,334,330 A | * | 11/1943 | Janowsky | A45B 19/00 160/78 |
| 3,736,976 A | * | 6/1973 | Palmer | E04F 10/0614 160/79 |
| 9,222,264 B1 | * | 12/2015 | Reid | E06B 9/0638 |
| 9,559,232 B1 | * | 1/2017 | Naud | H02S 30/20 |
| 10,560,050 B2 | * | 2/2020 | Raghunathan | H02S 30/20 |
| 2004/0221965 A1 | * | 11/2004 | Wagner | E04F 10/0625 160/67 |

(Continued)

*Primary Examiner* — Bethany L Martin
(74) *Attorney, Agent, or Firm* — Law Office of John Stattler

(57) ABSTRACT

An expandable and retractable photovoltaic structure includes a base that provides support to permit mounting of the photovoltaic structure solely from the base. Photovoltaic panels are arranged adjacently between the base and a lead element when the photovoltaic structure is in an open configuration. The photovoltaic structure is supported by scissor link mechanisms, coupled to the base at one end and the lead support element at the other end. The scissor link mechanisms consist of scissor links pivotally coupled together to form a moveable successive chain of the scissor links. The photovoltaic panels are attached to the scissor links, via side frames, so that as the lead arm moves away from the base the scissor link mechanisms expand to deploy the photovoltaic structure in an open configuration, and as the lead arm moves towards the base, the scissor link mechanisms retract the photovoltaic structure to place the photovoltaic structure in the closed configuration.

28 Claims, 4 Drawing Sheets

(56) References Cited

U.S. PATENT DOCUMENTS

| | | | |
|---|---|---|---|
| 2013/0233371 A1* | 9/2013 | Rodin | H02S 30/20 |
| | | | 136/245 |
| 2016/0173025 A1* | 6/2016 | Baumgartner | H02S 20/20 |
| | | | 136/245 |
| 2016/0211795 A1* | 7/2016 | Sun | H02S 30/20 |
| 2017/0063290 A1* | 3/2017 | Kurlagunda | B60L 8/003 |
| 2019/0006984 A1* | 1/2019 | Albertella | H02S 30/20 |
| 2020/0011123 A1* | 1/2020 | Petrmichl | E06B 9/264 |
| 2020/0106383 A1* | 4/2020 | Retti | F24S 30/425 |

* cited by examiner

ENERGY GENERATING PHOTOVOLTAIC AWNING WITH SCISSOR MECHANISM AND TILTING PHOTOVOLTAIC PANELS

FIELD OF THE INVENTION

This invention is related to the field of expandable solar power generating systems. More specifically, this application relates to a design for a novel photovoltaic awning system that uses scissor links to interconnect the photovoltaic panels, which can be opened or closed in order to expand or retract the attached photovoltaic panels as needed for its operation.

BACKGROUND

The following description includes information that may be useful in understanding the disclosure set forth herein. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Many building and vehicles, such as recreational vehicles (RV) and boats, use visors, awnings, canopies or blinds to protect against solar radiation, provide shade and keep buildings or vehicles cool.

Incorporating solar generation capabilities on these shade-providing structures is advantageous because it provides the double benefit of both blocking the sun while simultaneously using that energy to generate power. Many commercial solutions exist today that incorporate solar on fixed structures such as pergolas and carports in homes and commercial buildings. However, these structures are fixed into the ground and require extensive construction labor to install them. Many homes and commercial buildings also mount a solar panel on top of windows and doors using fixed brackets as a power generating shade structure.

Vehicles such as RV's use awnings for shade. There is also a lot of interest in integrating solar into awnings of recreational vehicles because these vehicles often travel to remote locations and have a need for off-grid power. To address this need, many awning manufacturers have tried to innovate in order to incorporate solar in awnings of recreational vehicles.

U.S. Pat. Nos. 7,576,282B2, 8,748,729B2 and EP1082502B1 describe embodiments in which the solar modules are flexible and roll-able and the expansion/retraction of the awning is achieved by rolling the thin film solar modules onto a rotating drum at the base of the awning, just as you would with a traditional awning. The issue with this methodology is that all these solutions require the use of thin film solar cells in a roll-able fabric like form. Such roll-able film solar panels either do not have high enough efficiencies (as in the case of amorphous silicon cells) or are very expensive (like III-V cells or CIGS). Additionally, the rolling and un-rolling of the thin film solar cells lead to fatigue in the cells and has the potential to reduce its life span.

U.S. Pat. No. 5,433,259A and DE202009000485U1 also use the rotation of the awning fabric on a roller to operate the awning, however in these embodiments the solar cells are rigid and are integrated as a strip at the beginning or the end of the awning fabric, locations where rotation on the roller does not happen. The issue with this approach is that energy generating surface area in these embodiments is limited given that only a narrow solar strip can be incorporated in these designs. Hence not enough energy can be generated from these implementations.

DETAILED DESCRIPTION

Figure 1:
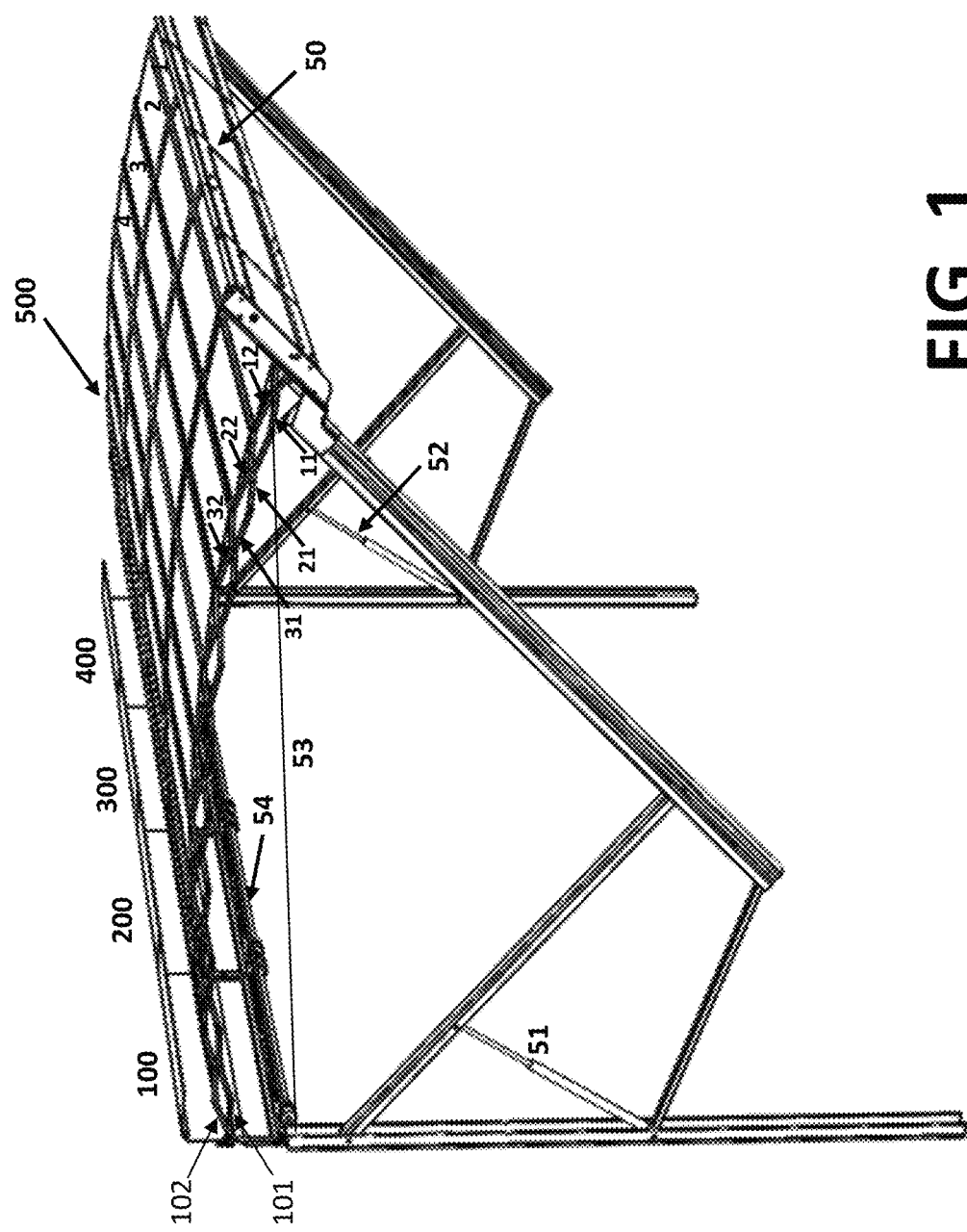
FIG. 1 illustrates a solar awning in a deployed state.

The present disclosure describes embodiments in which the entire awning is comprised of standard and commercially available rigid solar cells. For these embodiments, an interconnected group of solar modules are vertically stacked together in the closed configuration and deployed by movement of a lead arm that is connected to the last solar panel. As the lead arm moves forward the last solar panel in the stack that is connected to it is pulled along which in turns pulls the rest of the modules in the stack. When fully extended each solar panel in the stack goes from a vertical position to a horizontal position overlapping each other to form a covered shade structure.

One of the challenges faced in deploying such an awning is to ensure that the solar panels do not sag as a result of the gravity when fully extended. It is critical to have a robust mechanical interconnection between the panels in order to counter the gravitational forces as a result of the weight of the panels when extended.

Scissor mechanisms are incredibly versatile mechanisms that have been used in various applications from lifts to bridges in order to carry or support heavy loads. Scissor mechanisms are also commonly used in many applications where expansion and retraction are needed, like length adjustable lamps, portable canopies and collapsible attic ladders.

As described herein, by attaching solar panels to a scissor link mechanism, the embodiments disclosed herein benefit from the expandability of the scissor mechanism and its structural strength to deploy an awning that does not sag under gravity when fully expanded. Additionally, these embodiments also have the advantage of simultaneously tilting the solar panel in a vertical position to a horizontal position as the scissor link goes from a vertical orientation when collapsed to a horizontal orientation when extended.

The present disclosure describes herein unique deployable photovoltaic awnings and canopy systems. Photovoltaic awnings and canopy systems disclosed herein are collectively referred to herein as awnings. The photovoltaic awning system has solar modules or solar panels stacked together vertically (e.g., each module is oriented vertically with respect to the next module). The solar modules in the stack are interconnected to each other, both mechanically and electrically. The solar awning system further includes two scissor link mechanisms that connect a base of the awning to a lead arm of the awning. The two scissor link mechanisms provide structural support such that the solar awning system may be mounted on a wall, at one end, and can become fully supported, without the need to support the solar awning at the side of the lead arm. Each of the scissor link mechanisms comprise a plurality of scissor links, and the scissor link mechanisms are configured such that the scissor links on one side mirror the scissor links on the other. Every module in the stack is pivotally connected to the adjacent module through scissor link mechanisms in a manner as described more fully below. In some embodiments, a pivot point between two of the scissor links is located off-center such that expansion of the scissor link mechanism results in an arched photovoltaic structure.

It is contemplated that the panel can be made of polymers, glass, wood, metal, or combinations or composites thereof, and can further incorporate functional elements, such as lights, sensors, heaters, acoustic devices, displays, or photovoltaic cells. In preferred embodiments, the panels are at least partly photovoltaic panels, preferably mostly photovoltaic panels, and more preferably predominantly photovoltaic panels. In some embodiments, photovoltaic cells make up at least 60% of a surface of the panels, preferably at least 70%, 80%, 90%, or more preferably at least 95% of a surface.

A photovoltaic cell, or plurality thereof, may also be embedded in the lead arm, or in an enclosure that contains the awning when the awning is in a closed conformation, such that power generation is enabled even when the awning is closed.

The solar panels are electrically interconnected to one another, for example in series, parallel, or a combination thereof, and preferably arranged in an architecture to produce maximum energy. The generated power from the awning may be converted to AC using an inverter and fed into a power grid that the awning is attached to or used to power AC based appliances. Alternatively, the generated DC power may be connected to a charge controller and used to power DC appliances directly or stored into a battery system and used to power appliances used for off-grid applications, such as camping or recreational vehicles. Viewed from another perspective, the photovoltaic awning is coupled with a charge controller, inverter or energy storage system, such that energy collected or generated by the awning during the day can be used or stored for use at night or when there is insufficient light.

While it is contemplated the awnings incorporate solar elements (e.g., photovoltaic cells, etc.), additional elements may be incorporated into the awnings, for example a light emitting diode, an organic light emitting diode, a thermal element, a wooden support element, a metallic support element, or a plastic support element. For example, an awning may collect or generate energy during the day via solar elements and provide light and heat at night via the light emitting or thermal elements.

In some embodiments, a plurality of stacks of the photovoltaic panels are independently mounted adjacent to each other along the short edge of the photovoltaic awning such that the stacks of the photovoltaic panels expand together to deploy the photovoltaic structure in the open configuration and retract together to place the photovoltaic structure in the closed configuration.

In some embodiments, a first solar panel is directly attached to a first scissor link, which is pivotally connected in the middle to the second link on which no solar panels are attached. In other embodiments, s solar panel is coupled to a side frame which, in turn, is attached to a scissor link. A third link in the chain is then pivotally connected to one end of the second link. A second solar panel is then attached to the third link in the chain, which is parallel to the first link on which the first solar panel is attached, and this configuration is repeated again to form a stack of desired number. This configuration allows the modules to be oriented essentially parallel to one another at a regular spacing from one another. This configuration is advantageous for many reasons. It allows the panels to be tilted simultaneously as the scissor links are collapsed and expanded. Secondly, when the panels are tilted, the gap between the modules allows for debris to be shed as the awning is retracted. Finally, because of the gaps between the panels when the panels are tilted, the awning is much more tolerant to impact of wind.

The first scissor link in the system is attached to one end of the awning, called the base. The base of the awning is typically mounted to a building, vehicle, mobile home, or other appropriate structure. The last scissor link is attached to a movable support structure called the arm of the awning, also referred to as the lead arm.

The lead arm is moved back and forth (e.g., away and toward, etc.) from the base of the awning to enable the expansion or retraction of the awning. It should be appreciated that as the lead arm moves away from the base, the awning is expanding, and when the lead arm moves toward the base, the awning is retracting.

The lead arm may be actuated either manually or by other means such as electrically or pneumatically. In the embodiment illustrated in FIG. 2, an air strut is used to push the lead arm away from the base. If the actuation of the lead arm is done using pneumatic devices, like an air spring, then the forces on the lead arm is one directional. In that case, another mechanism is needed to bring the lead arm back to its original position. In some embodiments described herein, this is achieved using a roller tube and cable assembly.

In some embodiments, a roller tube is attached to the base of the awning that winds and un-winds a wire or several wires that is also connected to the lead arm of the awning. In other embodiments, the roller tube maybe attached to the lead arm. The roller tube can be rotated, using a motor for example, in either direction in order to wind or unwind the wire. As the wire unwinds on the roller tube, the lead arm, which is being pushed by the air springs, starts to move forward and away from the base of the awning. In order to close the awning, the roller tube is then rotated in the opposite direction, which then winds the cable back on the roller tube pulling the lead arm towards the base.

Such a dual mechanism, used in some embodiments, namely, an air strut, to open the awning and a motor driven pulley system to close the awning, may not be required if a bi-directional actuation mechanism, like a linear actuator, to both expand and/or retract the scissor links, is used.

As the lead arm moves out, it pulls the last scissor link along with it subsequently pulling all the other links pivotally connected to it. As the scissor mechanism is stretched, the links also move from a horizontal orientation to a vertical orientation, and this, in turn, leads to the tilting of the panels connected to the scissor links. These embodiments have the advantage that the panels are automatically tilted as the awning is expanded.

The panels are electrically connected to each other and, in some embodiments, the scissor links serve as a conduit to route the wires between adjacent panels. This will ensure that the electrical wire is not dangling lose between the panels. In some embodiments, the solar modules are electrically interconnected to each other using a detachable connector, which may be housed on the scissor link between the modules. In some embodiments, the scissor link has a recessed groove in order to house the connector. This design allows the user to easily disconnect and replace any solar module that is damaged during use without the need to replace the entire stack.

In some embodiments, the solar module is connected at a fixed angular off-set to the scissor link. This offset enables the solar modules to become completely horizontal in the expanded state before the scissor links are fully expanded. The strength of the scissor link mechanism is the weakest in the most extended state. Hence, enabling the module to be fully horizontal before the scissors are fully expanded provides structural strength and rigidity to the panels.

In other embodiments, the side frames support the photovoltaic panels at an angle substantially co-planar to the scissor links.

Additionally, the solar panels may be designed to be easily detachable from the scissor links in case they need to be replaced due to failures. In this case, the photovoltaic panels are removable such that removal of one of the photovoltaic panels from the scissor links doesn't affect the integrity and operation of the scissor link mechanisms.

Turning to the drawings, FIG. 1 illustrates a solar awning system (500) in a deployed state. The solar awning (500) consists of enclosures with solar panels stacked inside it (100, 200, 300 and 400) mounted adjacent to each other on a wall. Each stack of solar panels consists of several modules (1, 2, 3, 4, etc.). The solar panels (1, 2, 3 and 4) are coupled, directly or indirectly, to each other through scissor links (11, 12, 21, 22, 31 and 32), respectively, on one end and another set of identical links in the other end (not shown).

In this embodiment, the system is actuated using an air strut (51, 52), or similar mechanism, that pushes the lead arm (50) forward. The movement of the lead arm (50) is controlled using a cable (53) that is attached to it and is wound on a roller tube (54) on the other end. The roller tube (54) in this embodiment is located at the base of the awning and is rotated using a motor mounted next to it. As the roller tube (54) is rotated in one direction, the cable (53) gets wound on it pulling the lead arm (50) closer to the base and thereby retracing the awning. Conversely, when the roller tube (54) is rotated in the other direction the cable (53) is unwound on it, allowing the lead arm (50) to be pushed further by the air struts (51, 52), thereby expanding the awning.

While it is contemplated that the photovoltaic awning system is deployed and retracted generally via an electrical motor, the photovoltaic awning system is also designed to operate by manually operating the motive element (e.g., turning a crank, pulling a line, extending a pole, etc.) in a default mode, in case the electrical actuation fails. In other embodiments, it is conceivable that the photovoltaic awning system may be operated via pneumatic force, hydraulic force, mechanical force, electromagnetic force, or gravitational force.

As the lead arm moves back and forth, it pulls the last scissor link attached to it which, in turn, pulls along with it all the interconnect scissor links and solar panels. Additionally, since the last scissor links from all stacks of solar panels (100, 200, 300, 400) are connected to the same lead arm (50) it enables synchronous deployment of all the solar panels as the lead arm (50) moves back and forth.

The first scissor link in every stack of solar panel (11, 12 for example) is connected to lead arm (50), and the last link in every stack of solar panel (101,102 for example) is connected to the enclosure or base (100 and 400, for example), mounted on the wall.

Figure 2:
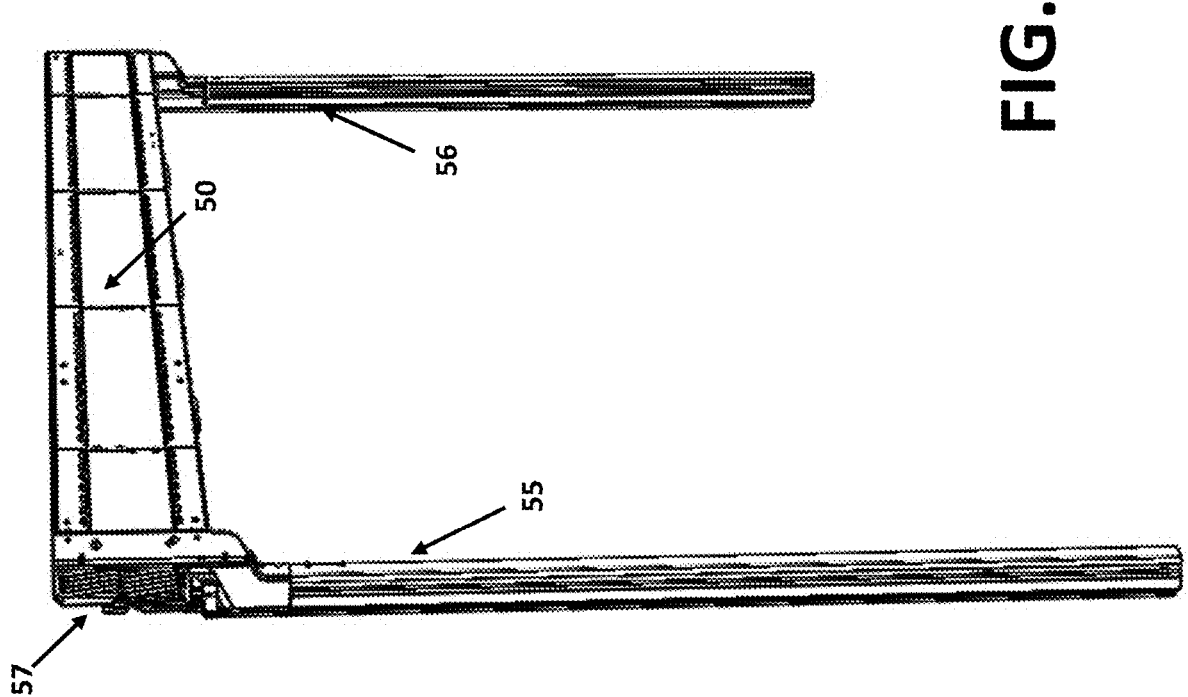
FIG. 2 illustrates a solar awning in the retracted state

FIG. 2 illustrates a solar awning in the retracted state configured in some embodiments. The lead arm (50) in this embodiment also provides a cover for the solar panels stacked behind it. The lead arm (50) is connected to side arms (55, 56) on both ends. The side arms (55, 56) consist of various components that are pivotally connected to each other and can be actuated using air struts. In the closed position, the various components and the air struts remain stacked behind the front face of the mounted arms (55,56). Behind the lead arm (50) multiple stacks of solar panels (57) are mounted on the wall.

Figure 3:
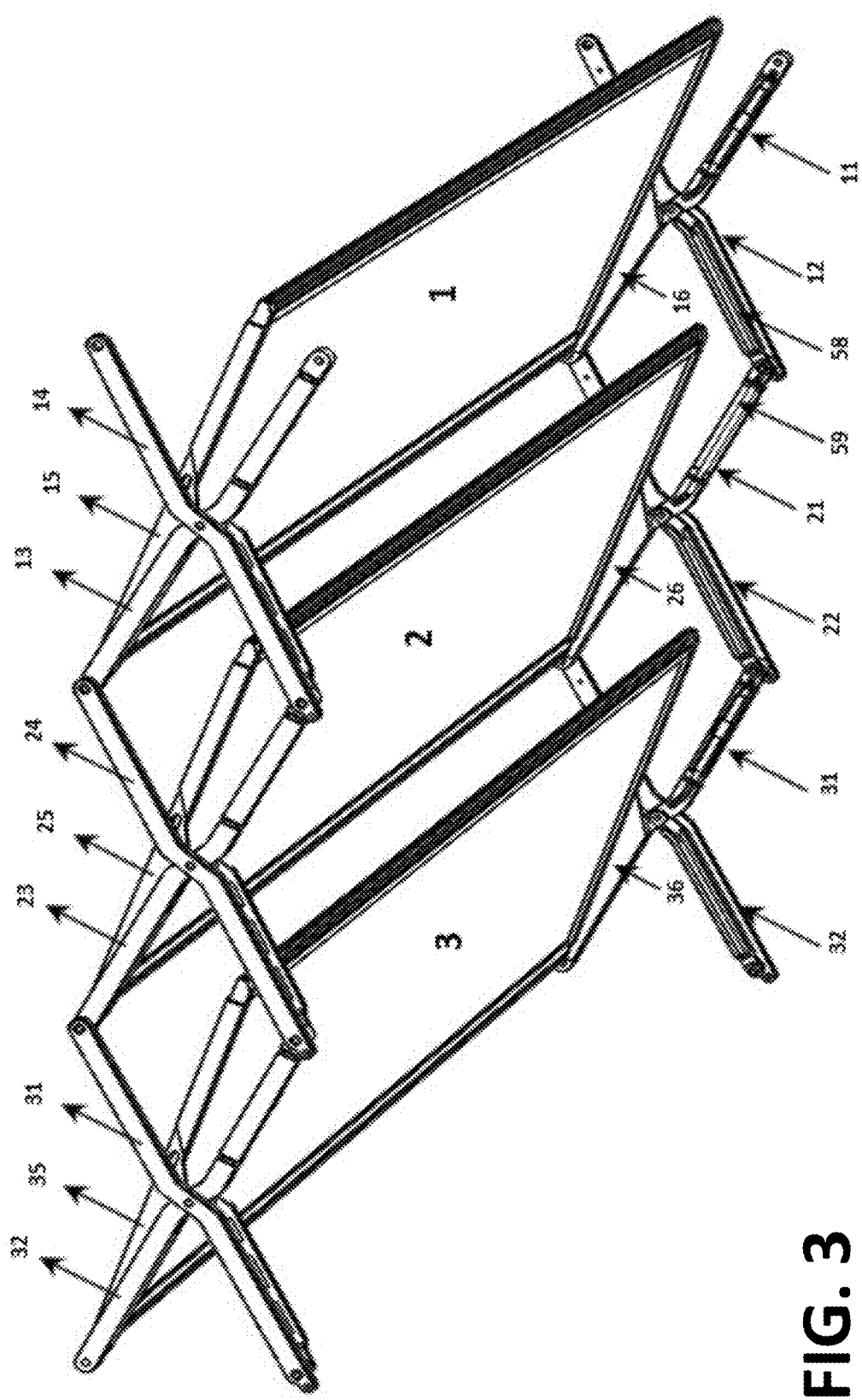
FIG. 3 illustrates embodiments of a solar module attachment to the scissor link and electrical interconnections between the modules.

FIG. 3 illustrates details of an embodiment of solar modules attached to the scissor links. This embodiment includes a plurality of angled side frames (25 and 26 for solar panel 2, 15 and 16 for solar panel 1, 35 and 36 for solar panel 3). As illustrated in FIG. 3, the angled side frames (25 and 26, 15 and 16, and 35 and 36), located at the two ends of the solar panels (2, 1 and 3, respectively), are directly attached to scissor links (21 and 23 for solar panel 2, 13 and 11 for solar panel 1, 32 and 31 for solar panel 3) keeping the solar panels (2, 1 and 3) at a fixed offset to the links (21 and 23, 13 and 11, 32 and 31). Each of these scissor links, on which the solar panels are attached, are then pivotally connected, at its center, top and bottom ends, to three other scissor links on which there are no solar panels attached as shown in FIG. 3. For example, scissor link 21 is connected pivotally to scissor link 22 at its center, and scissor links 32 and 12 on its top and bottom. The scissor links 32 and 12 do not have any modules attached to them. Each of the end scissor links 32 and 12 are in turn pivotally connected at its center to scissor links 31 and 11 on which solar panels are attached. Scissor links 31 and 11 are in turn connect to scissor link 22 on its two ends making this a completely interconnected system of three panels that are interconnected to each other via scissor links and can be actuated using the scissor links. The solar panels (2, 1 and 3) attached on scissor links (11, 21 and 31), respectively, are adjacent to each other and move in synchronization and parallel to one another.

If one of the first links in the chain of scissor links (11 or 13) is fixed to the wall on one end, and one of the last links in the chain (31 or 32) is pulled forward on the other end, all the other scissor links connected to both move forward and tilt down. Since solar panels are attached to these scissor links, they track the movement of the links both moving forward and simultaneously tilting from a vertical orientation to a horizontal orientation. When fully expanded, the panels overlap each other forming a continuous shade structure as shown in FIG. 1.

In some embodiments, the solar panels (1, 2, 3) are rigidly attached to every alternate scissor link to enable simultaneous tilting and expansion of the system as the lead arm moves back and forth to expand and retract the solar awning system (500). This configuration also allows the panels to move parallel and separate from one another enabling debris shedding before closing. The ability to tilt the panels also allows access to the solar panels for inspection, repair, or cleaning.

FIG. 3 also illustrates one embodiment for electrically interconnecting the solar modules. As illustrated in FIG. 3, the electrical interconnection between the solar modules (1, 2) is routed through channels (58, 59) attached on the scissor links (12, 21). This routing always enables the wiring between two modules to stay at fixed length preventing slack when closed. The scissor link in this embodiment is designed to house a connector between the modules so that the modules can be disconnected and replaced easily in the field.

Figure 4:
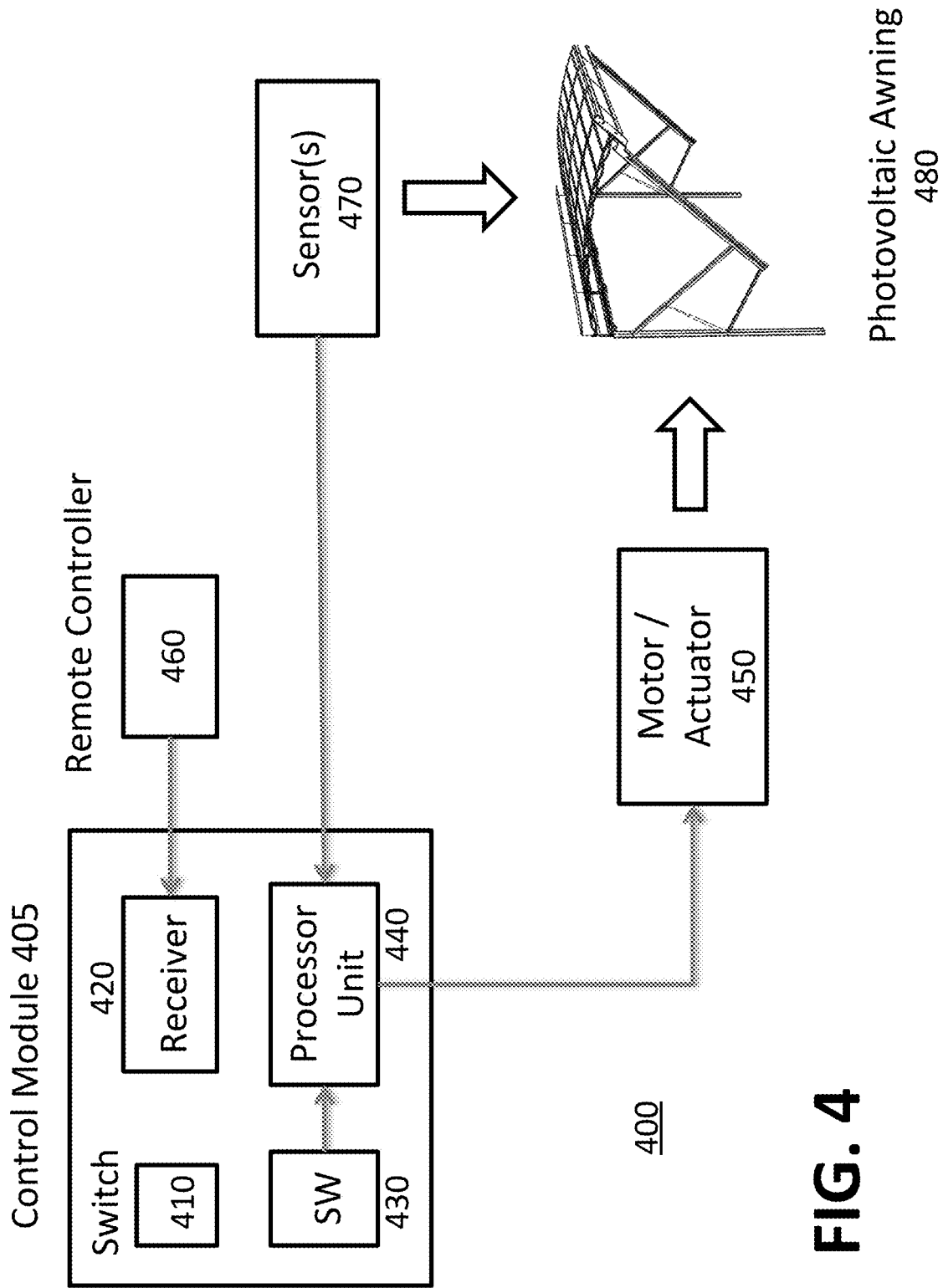
FIG. 4 is a block diagram illustrating embodiments for photovoltaic awning system.

FIG. 4 is a block diagram illustrating embodiments for photovoltaic awning system (402). For these embodiments, a control module (405) provides enhanced functionality for operation of the photovoltaic awning structure (illustrated as photovoltaic awning 480 in FIG. 4), as described herein. A user may control deployment and retraction of the photovoltaic awning structure (480) through a control module 405. For these embodiments, the photovoltaic awning system (402) includes remote control (460), as well as companion receiver (420) and panel control (410) located on the control module (405). Using either remote controller (460) or panel control (410), the user may control the operation of the photovoltaic awning structure (480). Specifically, the user may initiate commands, through control module (405), to deploy the photovoltaic awning structure (480) from a closed conformation to an open conformation; retract the photovoltaic awning structure (480) to move it from an open conformation to a closed conformation; move the photovoltaic awnings structure (480), initially in a least a partial open conformation, to tilt the panels. For example, the photovoltaic awnings system (400) may allow a user to execute a command to fully deploy or fully retract the photovoltaic awning structure (480), or to partially deploy or partially retraction, so as to control the tilt of the panels.

The photovoltaic awning (480) includes a plurality of sensors (470) to sense a number of conditions, such as environmental, physical, etc., exhibited at the photovoltaic awning structure (480). The sensor(s) (470) collect data at the photovoltaic awning structure (480), and transmit the sensor data to a processor unit (440) at the control module (405). Processor unit (440) includes one or more processor chips, and memory, and provides the computational capabilities to conduct the functions described herein. The control module (405) further includes software (SW) (430), stored in non-volatile memory, to provide instructions for execution in the processor unit (440). SW (430) includes a set of instructions to perform the functions described herein with regard to the control module (405) and its interface with photovoltaic awning structure (480).

As shown in FIG. 4, processor unit (440) is coupled to motor/actuator (450), which is coupled to the photovoltaic awning structure (480), to deploy and retract the awning, as described above. For these embodiments, processor unit (440) provides signaling to motor/actuator (450) to effectuate the movement of the photovoltaic awning structure (480), as described herein.

In some embodiments, the control module (405) may monitor the optimal orientation of the tilt of the panels in order to ensure that the solar generation system generates maximum possible energy the system. The photovoltaic awning system (402) may be designed to tilt the panels during the day to track the sun and maximize energy generation. For example, orientation of the panels may be monitored with respect to a solar energy source (e.g., sun, etc.), and a program (e.g., software 430 running in the processor unit 440) determines a tilt of the photovoltaic panels toward the solar energy source to maximize energy production, and optionally tilts the panels accordingly. It should be appreciated that tilting of the panels towards the sun through the day and regular cleaning of a photovoltaic surface of the panel can improve power generation by more than 10%, 20%, or even more than 40%.

The control module (405) may further provide means to tilt the photovoltaic cells to a cleaning conformation, where a photovoltaic surface of the panel faces downward and is easily accessible for cleaning.

The photovoltaic awning system (402) may incorporate several sensors (470) that enable intelligence or smart operation of the system. The photovoltaic awning system (402) may also include one or more sensors (470) to detect adverse weather conditions, such as high wind, rain or snow and hail. For example, a wind sensor (sensor 470) may detect high wind, and send a signal that encodes the wind speed from the wind sensor and to the processor unit (440), which triggers tilting of the panels from a substantially horizontal orientation to a slightly vertical orientation in order to allow the wind to flow through the awning to reduce the lift forces from the wind on the awning. In some embodiments, when the wind forces and weather condition exceed a damage threshold, the wind sensor (sensor 470) triggers the photovoltaic awning structure (480) to move the awning toward a closed conformation so as to close the awning for safety. In other embodiments, the sensor comprises a rain sensor that detects a rain event and that generates a signal indicating rain. The processing unit (440) receives the signal from the rain sensor (sensor 470) to trigger movement of the lead arm towards the closed configuration when the signal indicates rain. In yet other embodiments, the sensor comprises a hail or snow sensor that detects a hail or snow event and that generates a signal indicating the hail or snow event. The processing unit (440) receives the signal from the hail or snow sensor (sensor 470) to trigger movement of the lead arm towards the closed configuration when the signal indicates a hail or snow event. In yet other embodiments, the processor unit (440) receives weather forecast data and predicts adverse weather conditions from the weather forecast data that may damage the awning. If the weather forecast data indicates that the awning may be damaged, the the processor (440) triggers either a partial retraction or a full retraction of the awning to a closed configuration.

The photovoltaic awning system (402) may also have other sensors (470) to detect obstructions during operation (e.g., shadow on the panel). For this embodiment, the sensor(s) (470) detect an amount of shade on the awning, such that the sensor (470) sends a signal to a user via the control module (405) when the amount of shade exceeds a shade threshold.

The photovoltaic awning system (402) may also include one or more sensors (470) to detect an obstruction near the awning (e.g., tree branch, pole, person), such that the sensor (470) sends a signal to the processor unit (440) to trigger a halt of the expansion or retraction of the awning structure (480), if such an obstruction is detected. For example, sensors (470) may detect an obstruction to the photovoltaic structure and trigger the motor/actuator (450), via the processor unit (440), to stop expansion or retraction before the photovoltaic structure hits an object, thereby preventing any damage to the photovoltaic structure.

In embodiments where the photovoltaic awning system (402) is coupled to a vehicle, the system (402) further includes one or more sensors (470) to detect motion of the vehicle, such that the sensor (470) sends a signal to the processor unit (440) to trigger retraction of the awning structure (480), so that the driver does not drive away with the awning structure (480) in the open conformation. In some embodiments, when coupled to a vehicle, the awning is retracted into its enclosure when motion of the vehicle is detected. Likewise, when the awning base is attached to a surface, a safety alarm may further be included to alert the user if the awning base is detached from the surface to prevent theft. The photovoltaic awning system (402) may also have other sensors (470) to detect removal of the system from the mounted surface to prevent theft.

What is claimed is:

1. An expandable and retractable photovoltaic awning structure, comprising:
   a base of the photovoltaic awning structure, providing support to permit mounting of the photovoltaic structure to a mounting surface solely from the base;
   a plurality of photovoltaic panels;
   a plurality of side arms coupled to the base so as to support the expandable and retractable photovoltaic awning structure from the mounting surface;
   a lead arm of the photovoltaic awning structure, coupled to a lead photovoltaic panel, and also coupled to the side arms so as to couple the lead photovoltaic panel to the base at both sides of the lead arm;
   a plurality of scissor link mechanisms, coupled to the base at one end, and the lead arm at the other end, wherein the scissor link mechanisms comprise a plurality of pairs of scissor links pivotally coupled together to form a moveable successive chain of the scissor links, wherein each of the pairs of the scissor links comprise an inner link, located on the side of the photovoltaic panels, and an outer link;
   a plurality of side frames, comprising a left and a right side frame, wherein each of the side frames is coupled to a corresponding side of the photovoltaic panels;
   wherein the left and the right side frames of the photovoltaic panels, adjacent to the scissor link mechanisms, are directly attached to at least a portion of the inner link in a manner that creates a fixed angular offset between a first plane and a second plane, wherein the first plane is defined by a plane intersecting the length of the two inner links on either side of the photovoltaic panels and the second plane is defined by a plane intersecting the length of the two side frames on either side of the photovoltaic panels, to enable the photovoltaic panels to lie substantially horizontally adjacent to one another in the open configuration without full extension of the pair of scissor link mechanisms;
   wherein, a top and a bottom of the side frames of the photovoltaic panels are not obstructed by or connected directly to the scissor link mechanisms and wherein the photovoltaic panels overlap each other when the photovoltaic awning structure is fully extended; and
   wherein, as the side arms move away from the base the scissor link mechanisms expand to move the photovoltaic panels from a vertical position to a horizontal position and the photovoltaic panels overlap each other to form a covered shade structure when the photovoltaic awning structure is fully extended in an open configuration, and as the lead arm moves towards the base, the scissor link mechanisms retract and collapse the photovoltaic awning structure to place the photovoltaic awning structure in a closed configuration.

2. The expandable and retractable photovoltaic awning structure as set forth in claim 1, wherein the side frames support the photovoltaic panels at an angle substantially co-planar to the scissor links.

3. The expandable and retractable photovoltaic awning structure as set forth in claim 1, wherein a pivot point between two of the scissor links is located off-center such that expansion of the scissor link mechanism results in an arched photovoltaic awning structure.

4. The expandable and retractable photovoltaic awning structure as set forth in claim 1, further comprising a plurality of stacks of the photovoltaic panels, independently mounted adjacent to each other along the mounting rail of the photovoltaic awning structure, such that the stacks of the photovoltaic panels expand together to deploy the photovoltaic awning structure in the open configuration and retract together to place the photovoltaic awning structure in the closed configuration.

5. The expandable and retractable photovoltaic awning structure as set forth in claim 1, wherein the photovoltaic panels are detachable from the scissor links for replacement.

6. The expandable and retractable photovoltaic awning structure as set forth in claim 1, further comprising a processor unit to determine an orientation of the photovoltaic panels in order to estimate and enable an optimal tilt of the photovoltaic panels to maximize energy production.

7. The expandable and retractable photovoltaic awning structure as set forth in claim 1, further comprising a sensor and a processor unit to control the tilt of the photovoltaic awning structure, and subsequently the angle of tilt of the photovoltaic panels.

8. The expandable and retractable photovoltaic awning structure as set forth in claim 1, further comprising an input device to generate a signal to trigger movement of the lead support element.

9. The expandable and retractable photovoltaic awning structure as set forth in claim 8, wherein the input device comprises a manual switch.

10. The expandable and retractable photovoltaic awning structure as set forth in claim 8, wherein the input device comprises a remote-controlled device.

11. The expandable and retractable photovoltaic awning structure as set forth in claim 1, further comprising at least one sensor and a processor unit coupled to a motor to control the deployment of the photovoltaic awning structure to the open configuration or retraction to the closed configuration, wherein:
   the sensor to detect obstructions near the photovoltaic awning structure; and
   the processing unit, coupled to the sensor, to stop the expansion or to trigger a retraction when an obstruction is detected by the sensor during the operation of the solar awning that may cause damage to the system.

12. The expandable and retractable photovoltaic awning structure of claim 1, further comprising at least one sensor and a processor unit coupled to a motor to control the deployment of the photovoltaic awning structure to the open configuration or retraction to the closed configuration, wherein:
   the sensor to detect movement of the vehicle on which the system is attached and to generate a signal; and
   the processing unit, coupled to the sensor, interrupts the signal from the sensor to trigger a retraction of the system in case the vehicle is accidentally driven when open.

13. The expandable and retractable photovoltaic awning structure as set forth in claim 1, further comprising at least one sensor and a processor unit coupled to a motor to control the deployment of the photovoltaic awning structure to the open configuration or retraction to the closed configuration, wherein:
   the processing unit to receive weather forecast data and to predict adverse weather conditions from the weather forecast data that may damage the expandable and retractable photovoltaic awning, and to trigger either a partial retraction or a full retraction of the awning to a closed configuration.

14. The expandable and retractable photovoltaic awning structure as set forth in claim 1, wherein:
   the side frames support the photovoltaic panels so as to enable simultaneous tilting of the photovoltaic panels, substantially parallel to one another, during deployment of the photovoltaic awning structure to the open configuration and during retraction of the photovoltaic awning structure to the closed configuration.

15. The expandable and retractable photovoltaic awning structure as set forth in claim 14, wherein adjacent photovoltaic panels are attached to alternate scissor links through the side frames in the successive chain of the scissor links thereby enabling simultaneous tilting of the photovoltaic panels, substantially parallel to one another, during deployment of the photovoltaic awning structure to the open configuration and during retraction of the photovoltaic awning structure to a closed configuration.

16. The expandable and retractable photovoltaic awning structure as set forth in claim 14, further comprising a processor unit to determine an orientation of the photovoltaic panels in order to estimate and enable an optimal tilt of the photovoltaic panels to maximize energy production.

17. The expandable and retractable photovoltaic awning structure as set forth in claim 14, further comprising a sensor and a processor unit to control the expansion of the photovoltaic awning structure, and subsequently the angle of tilt of the photovoltaic panels.

18. The expandable and retractable photovoltaic awning structure as set forth in claim 14, further comprising a plurality of wires, wherein the photovoltaic panels are electrically connected to adjacent of the photovoltaic panels with the wires routed along the scissor links.

19. The expandable and retractable photovoltaic awning structure as set forth in claim 18, wherein the wires are directly attached to the scissor links.

20. The expandable and retractable photovoltaic awning structure as set forth in claim 18, wherein the wires are routed through a conduit attached to the scissor links.

21. The expandable and retractable photovoltaic awning structure as set forth in claim 18, wherein the wires are electrically connected to adjacent panels with a plurality of detachable connectors.

22. The expandable and retractable photovoltaic awning structure as set forth in claim 21, wherein the connectors are housed in a recessed cavity on the scissor links.

23. The expandable and retractable photovoltaic awning structure as set forth in claim 14, further comprising at least one sensor and a processor unit coupled to a motor to control the deployment of the photovoltaic awning structure to the open configuration or retraction to the closed configuration, wherein:
the sensor to detect obstructions near the photovoltaic awning structure; and
the processing unit to halt the expansion or trigger a retraction when an obstruction is detected by the sensor during the operation of the solar awning that may cause damage to the system.

24. The expandable and retractable photovoltaic awning structure as set forth in claim 14, further comprising at least one sensor and a processor unit coupled to a motor to control the deployment of the photovoltaic awning structure to the open configuration or retraction to the closed configuration, wherein:
the photovoltaic awning is coupled to a vehicle;
the sensor to detect a movement of the vehicle on which the system is attached and to generate a signal to indicate the movement;
the processing unit to receive the signal from the sensor and to trigger a retraction of the system in case the vehicle is accidentally driven when open.

25. The expandable and retractable photovoltaic awning structure as set forth in claim 14, further comprising at least one sensor and a processor unit coupled to a motor to control the deployment of the photovoltaic awning structure to the open configuration or retraction to the closed configuration, wherein:
the processing unit to receive weather forecast data and to use the weather forecast data to predict adverse weather conditions that may damage the awning, and to trigger either a partial retraction or a full retraction of the awning to a closed configuration.

26. The expandable and retractable photovoltaic awning structure as set forth in claim 14, wherein the photovoltaic panels are detachable from the scissor links for replacement.

27. The expandable and retractable photovoltaic awning structure as set forth in claim 1, further comprising at least one sensor and a processor unit coupled to a motor to control the deployment of the photovoltaic awning structure to the open configuration or retraction to the closed configuration, wherein:
the sensor to detect adverse weather events such as wind, rain, snow and hail; and
the processor unit to receive the weather data from the sensor and to generate a signal that results in either a partial or a full retraction in order to reduce any damage to the awning from adverse weather conditions.

28. The expandable and retractable photovoltaic awning structure as set forth in claim 14, further comprising at least one sensor and a processor unit coupled to a motor to control the deployment of the photovoltaic awning structure to the open configuration or retraction to the closed configuration, wherein:
the sensor to detect adverse weather events such as wind, rain, snow and hail; and
the processor unit to receive the weather data from the sensor and to generate a signal that results in either a partial or a full retraction in order to reduce any damage to the awning from adverse weather conditions.

* * * * *